United States Patent [19]

Paver

[11] Patent Number: 5,574,925
[45] Date of Patent: Nov. 12, 1996

[54] ASYNCHRONOUS PIPELINE HAVING CONDITION DETECTION AMONG STAGES IN THE PIPELINE

[75] Inventor: Nigel C. Paver, Manchester, United Kingdom

[73] Assignee: The Victoria University of Manchester, Manchester, United Kingdom

[21] Appl. No.: 182,191

[22] PCT Filed: May 27, 1992

[86] PCT No.: PCT/GB92/00959

§ 371 Date: Jan. 19, 1994

§ 102(e) Date: Jan. 19, 1994

[87] PCT Pub. No.: WO93/01544

PCT Pub. Date: Jan. 21, 1993

[30] Foreign Application Priority Data

Jul. 4, 1991 [GB] United Kingdom .................... 9114513

[51] Int. Cl.⁶ .................................................. G06F 9/38
[52] U.S. Cl. ............................................................ 395/800
[58] Field of Search ...................... 364/DIG. 1 MS File, 364/DIG. 2 MS File; 395/200, 250, 375, 550, 800

[56] References Cited

U.S. PATENT DOCUMENTS 4,112,489   9/1978   Wood ...................................... 395/775

FOREIGN PATENT DOCUMENTS 0381470   8/1990   European Pat. Off. ........ G06F 12/08

OTHER PUBLICATIONS

IBM Technical Disclosure Bulletin, vol. 25, No. 12, May 1983, "Storage Access–Exception Detection for Pipelined Execution Units," Garcia et al, pp. 6711–6712.

Communications of the ACM, vol. 32, No. 6, Jun. 1989, "Micropipelines," Sutherland, pp. 720–738.

*Primary Examiner*—Robert B. Harrell
*Attorney, Agent, or Firm*—Nixon & Vanderhye P.C.

[57] ABSTRACT

A condition detector for an asynchronous pipeline. Each stage in the pipeline includes a storage element for storing a single bit of data indicating whether or not the condition to be detected is set in that stage. The single bit in the storage element of one stage is transferred to the storage element of a succeeding stage in the pipeline when data is transferred between those stages. A detector detects whether or not any one of the storage elements of the pipeline stages indicates that the condition is set, and a condition set output is generated if any one of the storage elements of the pipeline stages indicates that the condition is set.

10 Claims, 7 Drawing Sheets

ASYNCHRONOUS PIPELINE HAVING CONDITION DETECTION AMONG STAGES IN THE PIPELINE

BACKGROUND OF THE INVENTION

1. Field of the Invention

The present invention relates to condition detection in asynchronous pipelines.

2. Discussion of Prior Art

A pipeline is a mechanism used in computer architecture for speeding up system throughput. It is analogous to a production line, where the product (data) flows through a series of stages (circuits) in each of which an operation is performed to process the product (data). The use of a pipeline mechanism does not speed up the time taken for an individual element of data to traverse the pipeline (the latency) but rather increases the number of elements of data processed in a given time (the throughput). This is achieved because the operations comprising the pipeline can be kept simple and each can start processing a subsequent element as soon as the current element has passed through that stage. A non-pipelined implementation of the same set of operations requires that all processing is complete on any one of a number of elements before further elements can be processed.

Computer pipeline systems are conventionally synchronous. In such systems, several stages operate in "lockstep". A global clock signal is asserted when all the stages have completed operation and data is transferred to subsequent stages. This gives a simple structure which is easy both to model and to analyze. The clock period of the pipeline is, of course, limited to a minimum of the time taken for the slowest pipeline stage to complete its processing. The clock frequency thus derived determines the throughput of the pipeline. The pipeline latency is the clock period multiplied by the number of pipeline stages, which will generally be somewhat greater than the processing time for the same logic without pipelining.

For example, in a synchronous pipeline comprising three elements having respective clock frequencies of 50 MHz, 10 MHz and 30 MHz when operating in isolation, the maximum clock frequency of the system is limited to 10 MHz if all the elements are to function correctly. This frequency determines the pipeline throughput. Even if the slowest element is not in use, due for example to the pipeline having been flushed and not yet fully refilled, the system is synchronised to the global clock and thus cannot run any faster.

In an asynchronous system the basic speed limitation still applies, that is in the case outlined above the system would naturally adopt a throughput rate of 10 MHz given that this is the speed of the slowest element. However each element is free operate at its own rate and in an operation where the slowest unit was not in use the throughput would automatically rise to that of the next slowest element, that is 30 MHz in the example quoted. In asynchronous pipelines the latency is therefore the sum of the individual times per stage. The pipeline may well fill up at a greater rate than its throughput and length would suggest. Furthermore not all pipeline stages require a constant processing time. For example an arithmetic logic unit (ALU) may perform an add operation much faster than a divide operation. In an asynchronous pipeline each may be treated as a single operation without slowing the general throughput to the speed of the slowest.

The article "Micropipelines", Communications of the ACM, Vol. 32, No. 6 Jun. 1989, pages 720–738 by Sutherland, I. E., describes a framework for designing asynchronous circuits. A library of circuits is described which may be used to control asynchronous pipelines which are referred to as "Micropipelines" and are event controlled, that is to say they use single electrical transitions as control signals rather than voltage levels. Communication between stages of the pipeline uses a bundled data convention. A whole data word is accompanied by a single pair of event control lines. These indicate when the data is valid and when the data has been received by the next stage in the pipeline. Event control is sometimes called transition signalling as it uses electrical transitions to convey information.

The micropipeline approach can be used to construct a microprocessor. Each element of the data-path of the microprocessor can be made to correspond to a stage of a micropipeline. This is aided by the essential hierarchical structure of micropipelines as an element of the pipeline can itself contain an arbitrary number of pipeline stages.

Micropipelines incorporate a register bank in the form of a number of registers with common sets of READ and WRITE buses. All the registers are the same width, for example in a 32 bit microprocessor they would be 32 bits wide. The microprocessor executes instructions by reading the contents of one or two of the registers out of the bank, performing some operation on the read out contents, and then writing back the result of the operation into a third register in the register bank. The number of registers read out in any instruction is limited by the number of output ports of the register bank, which is usually two. After an instruction has been issued, an instruction decoder extracts the addresses of the registers that should be read and the register to which the result of the operation identified in the instruction should be written. These register addresses are passed to the register bank so that execution of the instruction may begin. The operands are read out and passed to a processing unit such as an ALU where some operation is performed to provide the result. Some time later the result arrives back at the register bank and is written to the appropriate register. Thus, if an instruction is issued which when completed will result in data being written to a particular register, and a subsequent instruction is issued which attempts to read that particular register, the subsequent instruction must be delayed until the instruction already in progress has been completed.

The problem of delaying read instructions described above is one example of difficulties that can arise in detecting conditional information in asynchronous pipelines. In such circumstances it is usually necessary both to detect the presence of items in the pipeline and to determine the position of those items within the pipeline.

SUMMARY OF THE INVENTION

It is an object of the present invention to enable such problems to be overcome by providing means for allowing condition information in asynchronous pipelines to be detected without the occupancy of the pipeline being determined.

According to the present invention, there is provided a condition detector for an asynchronous pipeline, wherein each stage in the pipeline comprises condition storing means for storing a single bit of data indicating whether or not the condition to be detected is set in that stage, said single bit in the condition storing means of one stage being transferred to the condition storing means of a succeeding stage in the pipeline when data stored in said one stage is transferred to said succeeding stage during operation of the pipeline, means are provided for detecting whether or not any one of the condition storing means of the pipeline stages indicates that the condition is set, and means are provided for generating a condition set output if any one of the condition storing means of the pipeline stages indicates that the condition is set.

The detecting means may be a simple array of gates, one in respect of each stage, with each gate having a first input connected to the conditions storing means of a respective stage, a second input connected to an output of the gate of a preceding stage, and an output connected to the second input of the gate of the succeeding stage. Such an arrangement is effective if the condition bit in one stage is copied to the next stage before the said one stage is emptied, and any empty stage presents an un-set condition. This second requirement may be achieved if the condition bit is combined with a stage occupied bit by providing a further gate at each stage to perform the combination. Alternatively such a further gate may not be required if each stage is essentially transparent, that is when empty it automatically presents an un-set condition.

The present invention may be applied in particular to an asynchronous pipeline system provided with a lock circuit to prevent a register being read if that register is to be written to by a preceding instruction. In such an arrangement, an asynchronous pipeline system would comprise a plurality of registers, means for generating a series of instructions to be executed by the system, means for reading the contents of one or more registers identified by an instruction, means for performing an operation identified by the instruction on the read out contents to produce a result, means for writing the result to a register identified by the instruction, a first in first out lock circuit for storing the identity of registers to be written to by instructions which are in progress, and means for delaying reading of the contents of any register identified by an instruction if that register is identified in the lock circuit, wherein the first in first out circuit comprises a two dimensional array of memory elements with each element being located at a respective intersection of columns and rows of the array, the number of columns of the array is equal to the number of registers and data related to each register is stored in a respective column, the number of rows in the array is equal to the maximum number of register identities that can be stored in the lock circuit, means are provided to identify each register to be written to by an instruction which is in progress by storing a single bit of data in the memory element of a respective row at the intersection of that row and the respective column of that register, and means are provided for determining whether a register will be written to by checking whether or not a said single bit of data has been stored in the respective column of that register.

Thus assuming that every memory element in the array normally stores a logic zero, when a first register identity to be stored is received a logic one is written to the bottom element in the column with which that register is associated. If a second register identity is subsequently stored, a logic one is written to the memory element in the next to the bottom row and the column associated with that second register. Once the instruction which resulted in logic one being entered in the bottom row of the FIFO has been completed, the bottom row is flushed and replaced with the bit pattern previously stored in the next to the bottom row. Thus if any register is to be written to by an instruction in process, this can be detected simply by looking in the column FIFO elements associated with that register. If there is a logic one anywhere in that column, that register must not be read. This condition can easily be detected using a simple series of gates.

BRIEF DESCRIPTION OF THE DRAWINGS

Embodiments of the present invention will now be described, by way of example, with reference to the accompanying drawings, in which.

DETAILED DISCUSSION OF PREFERRED EMBODIMENTS

Figure 1:
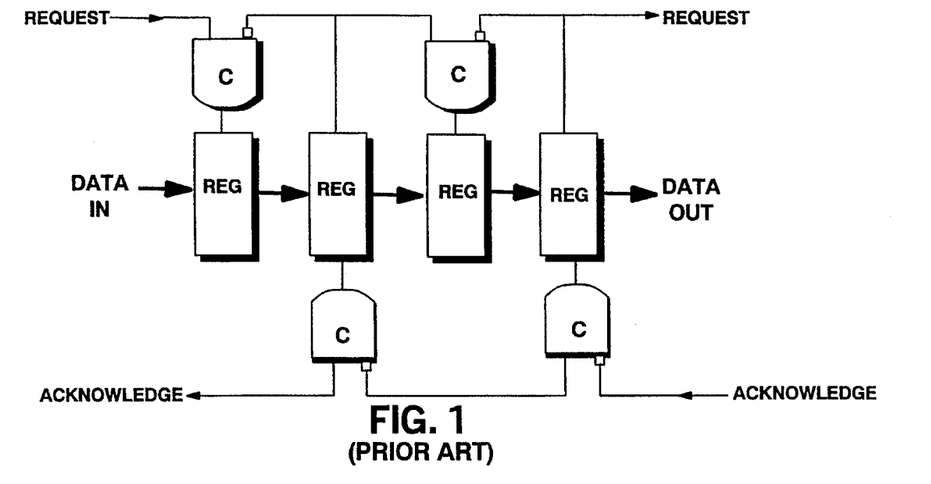
FIG. 1 is a schematic representation of a simple prior art micropipeline.

FIG. 1 illustrates a simple example of a prior art micropipeline in the form of a first in first out buffer (FIFO). Each rectangle represents a register operating as a latch. Each gate enclosing the letter C is a Muller C-element of the type described in the above referenced article by Sutherland. A Muller C-circuit has two or more inputs and a single output. It has the property that the state of its output remains constant until all its inputs are in the same state, when the output is forced to that state. Thus if the circuit output is at a logic low, it will remain low until all its inputs are high. It will then change its output to high and this state will be maintained until all the inputs have returned to logic low. The Muller C-element can therefore act as an AND gate for transitions (i.e. all the inputs were low and are now high, therefore each has experienced a transition) subject to certain considerations. It is important to note that the actual electronic device is sensitive to the logic levels on its inputs, not the transitions themselves. A second transition on an input will nullify a previous transition if the gate has not yet changed its output.

Figure 3:
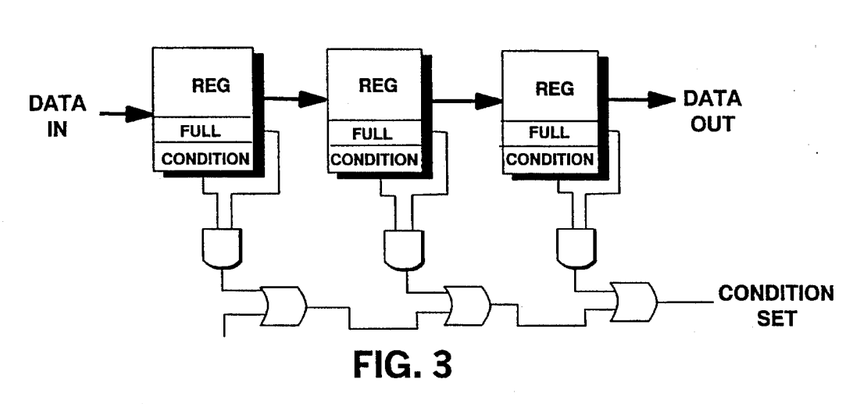
FIG. 3 is a simple illustration of an example of the present invention applied to a simple micropipeline of the type illustrated in FIG. 1.

In FIG. 3, the flow of data is indicated by arrows between adjacent register stages. Data is transferred through the register chain, the circuit operating to transfer data from one register stage after a request to transfer data has been transmitted to the subsequent register stage and an acknowledgement of reception of such has been returned. Thus in the illustrated circuit an input request signal triggers the first Muller C-element causing the input data to be latched in the respective register. When this latching process is completed the acknowledge signal is asserted, as is the request signal to the subsequent stage. The process then continues until the data input reaches the output of the FIFO where "request" is asserted and an external acknowledge signifying that data has been removed is awaited. If input data is received by the first register stage and at the time there is no other data in FIFO, the input data will rapidly pass through the register chain to the right hand register. In order to simplify the description of the FIFO arrangement, the last register in a FIFO register chain, that is the right hand register in FIG. 1, will be referred to as the "bottom" register hereinafter.

Figure 2:
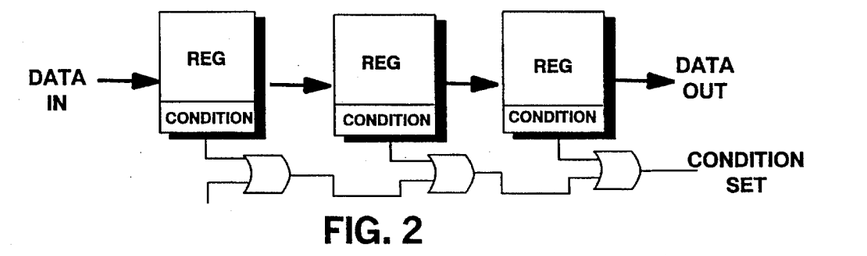
FIG. 2 is a schematic illustration of the present invention when applied to a simple micropipeline of the type illustrated in FIG. 1.

Circumstances can arise in which conditional information regarding the state of the micropipeline circuit has to be detected. In the simple case of FIG. 1 for example, it might be necessary to determine whether or not any of the registers are storing data. Alternatively it might be necessary to detect whether or not any of the registers is storing a particular category of data. The conventional approach to solving this conditional information detection problem is to provide circuitry which can read and compare the contents of the registers, but this approach adds considerable complexity to a circuit the basic building blocks of which are essentially simple. The present invention provides an improved solution to the conditional information detection problem by incorporating in the data that is flowing through the micropipeline a single bit of information which represents the conditional information of interest for the data with which the single bit of information flows. FIG. 2 illustrates schematically one way of implementing this proposal.

FIG. 2 shows a simple FIFO arrangement similar to that of FIG. 1 but with the omission of the request and acknowledge circuits so as to avoid unnecessary complexity in the drawings. As in the case of FIG. 1, a bit is transferred between successive registered stages. In addition however each register incorporates a storage element in which a single bit of condition data is stored. The storage element in which the condition data is stored for each register is connected to a respective OR gate the output of which is connected to one input of the OR gate of the next stage in the micropipeline. Thus if either input to or any one of the OR gates is logic "1", the condition set output will itself be logic "1". Thus simply by monitoring the condition set output, the existence of a particular condition in any one of the register stages can be readily detected.

For the correct operation of the scheme illustrated in FIG. 2, it is necessary that certain restrictions are maintained. Firstly, the condition bit must be copied from a first stage to a subsequent stage before the first stage is emptied. This is necessary to ensure that any "1" in the pipeline will be in at least one stage and can therefore be detected. If this overlap between stages is not ensured then there is the possibility that condition bits can be in transit from one stage to the next and yet not be in either stage. If this was to occur the condition detection could fail as the bit in transit would not be detected.

Secondly, any empty stage must present an un-set condition, so as not to affect the combination of all the conditional bits. Thus in any empty stage the condition storing element must store logic "0". This can be achieved providing each stage is "transparent", and providing the second input to the OR gate connected to the first register in this stage is held at logic "0", and providing the condition input to the FIFO has default value "0" except when writing a "1".

It is also necessary to ensure that nothing enters the first stage of the pipeline while a decision is being made about the state of the conditions in the pipeline. If this is not ensured then meta-stability problems can arise. For certain classes of pipeline this is not a problem. However, for example if entry into the pipe is only allowed if a certain condition is not in the pipe already (e.g. set the ALU condition codes), then nothing will enter pipeline until the condition has been flushed out of the bottom of the pipeline. In such a system, when the condition bit reaches the last stage of the pipeline it remains there until an acknowledge is received from the next unit. When the last stage of the pipeline is cleared this automatically removes the condition bit. If anything is waiting to enter the pipeline, as the condition bit is removed, the condition logic indicates the condition is no longer present and therefore the flow of data into the pipe may proceed.

In the case of non-transparent registers, conditional information can still be detected by providing circuits as illustrated in FIG. 3 to distinguish between a register which is empty and a register which is full. As shown in FIG. 3, each register stores one bit related to the condition to be detected and one bit related to whether or not the register is full. These two bits provide inputs to an AND gate in respect of each register such that an OR gate can only receive a logic "1" input if the respective register is full and the condition bit is set. This ensures that conditional information is only used when valid.

The approach described above for detecting conditional information can be applied to circumstances in which all of the information flowing down the pipeline is conditional information. The pipeline then becomes an elastic condition storage device. An example of a FIFO used in such a manner is described in some detail below, but it will be appreciated that the approach to the detection of conditional information in pipelines described above can be applied in a wide range of circumstances.

Figure 4:
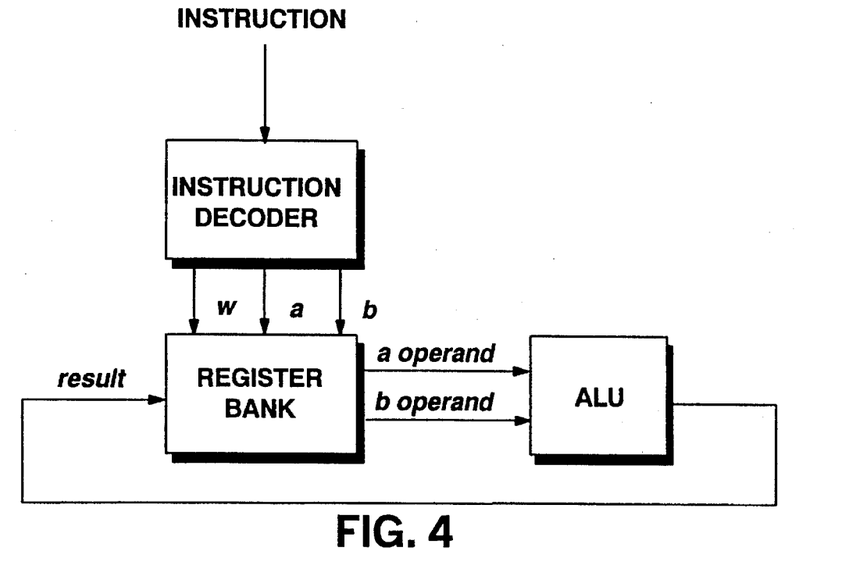
FIG. 4 illustrates schematically the structure of a register bank the operation of which can be controlled by using a condition detector in accordance with the present invention.

FIG. 4 illustrates the operation of a register bank provided in a microprocessor constructed by using a micropipeline approach. Each element of the data path of the microprocessor can be made to correspond to a stage of a micropipeline. This is aided by the essentially hierarchical structure of micropipelines as an element can itself contain an arbitrary number of pipeline stages. Given that the system is asynchronous however the interaction between READ and WRITE operations must be managed.

A register bank consists of a number of registers with common sets of READ and WRITE buses. All registers are the same width such that in the case for example of a 32 bit microprocessor all the registers would be 32 bits wide. The microprocessor executes instructions by reading the contents of one or two of the registers out of the bank, performing some operation on them, and then writing back the answer or result into a third register in the bank. FIG. 4 represents a high level view of this operation. The number of registers read by any instruction is limited by the number of output ports on the register bank which is usually two. An instruction decoder extracts from a received instruction the addresses of the registers that should be read (a,b) and the register where the results of the operation will be written (w). These addresses are passed to the register bank so that execution of the instruction may begin. The operands read out from registers (a and b) are passed to an ALU where an operation is performed in accordance with the instruction to provide a result. After completion of that operation the result is transferred back to the register bank and is written to the appropriate register (w). Thus there is a delay between reading from registers a and b and writing to register w. It is essential that register w is not read by a subsequent instruction until the result has been written to that register.

Figure 5:
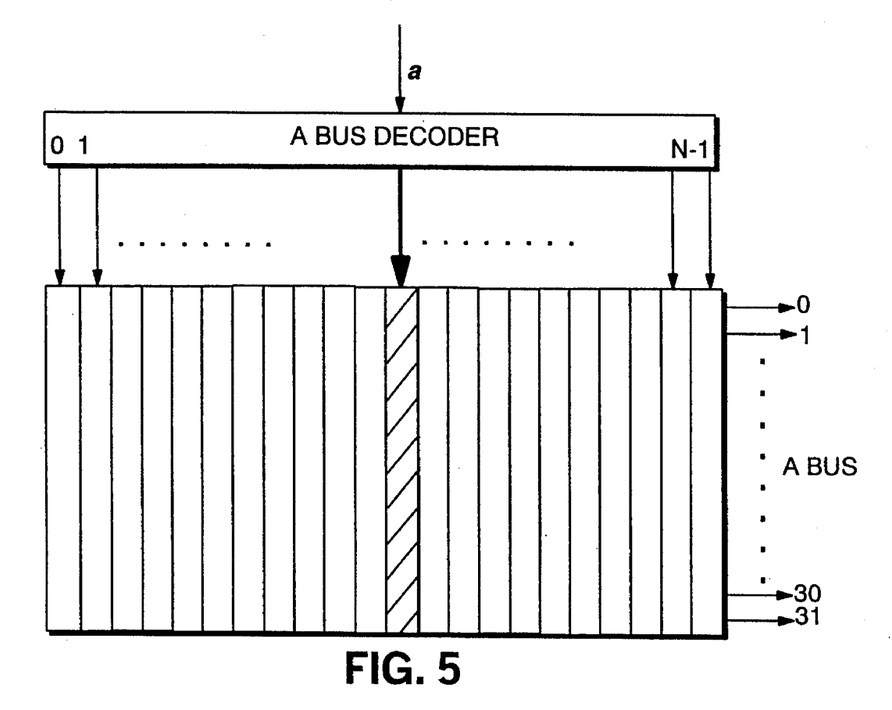
FIG. 5 schematically illustrates the internal structure of the register bank of FIG. 4.

FIG. 5 illustrates the internal structure of a typical register bank with reference to the A bus control logic. The other buses are similar. Each register occupies a vertical slice of the register bank, one of the registers being indicated by shading. Each register comprises 32 individual memory cells or elements to enable 32 bits of data to be stored. Each of these cells has an input which is used for changing the value its stores and two outputs which are used to read the stored value from the cell. Two outputs are required to enable the values to be read out to the separate a operand and b operand buses A and B. An operation which is performed on any one register is performed on all the cells of that register. Three enable signals are provided for each register to allow reading onto the (a) operand bus A, reading onto the (b) operand bus B, and writing from the result bus W into the cell.

As illustrated in FIG. 5, an A bus decoder which forms part of the instruction decoder of FIG. 4 takes the binary representation of the A operand register number (a) and converts this to a unary representation (1 out of N). This is then used as the A bus output enable of the selected register. FIG. 5 shows 1 out of N registers selected in this way. Similar decoders are provided for the B bus and for the write bus W but these have been omitted from FIG. 5 to avoid over-complication of the Figure. The A operand, the B operand and write buses all run horizontally through all the registers as shown in FIG. 5 but again the B and write buses have been omitted.

Figure 6:
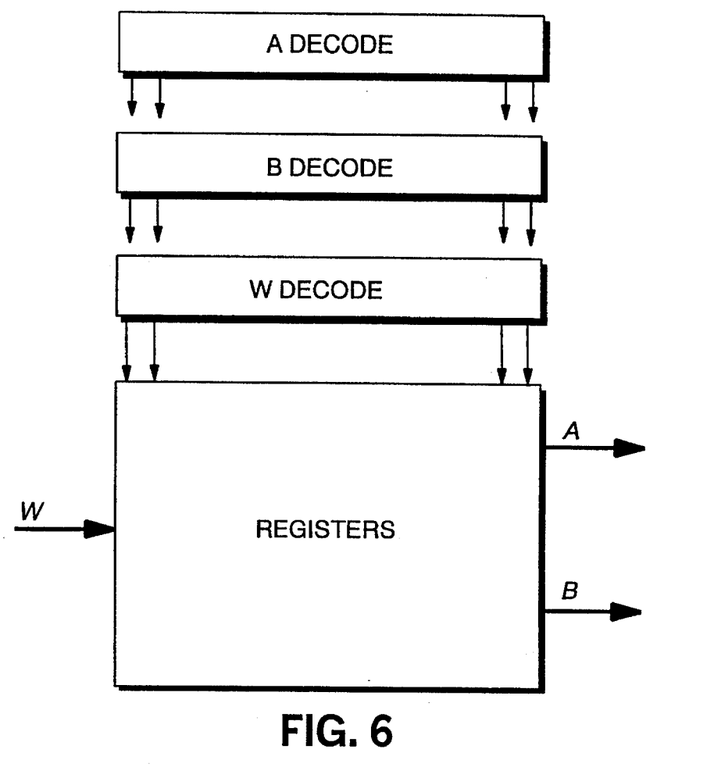
FIG. 6 schematically illustrates a decoder arrangement suitable for the register bank of FIG. 4 with reference to one of the read buses.

FIG. 6 illustrates the decoders and registers at a slightly higher level. Physically the decoders are stacked one on top of another with the decoder select wires passing vertically through the register bank.

If as the result of receiving a first instruction the register bank has read out operands but is still processing those operands, then generally there will be no reason why the register bank should not be allowed to proceed with a second instruction immediately after it has finished reading out the operands of the first instruction. The only constraint is that the second instruction cannot be permitted to read any register that is waiting for a result to be written into it from the write bus by an instruction which is already in progress. Thus it is necessary to provide a mechanism which delays an instruction if it seeks to read from a register which is still to be written to by an instruction in progress.

The structure described in FIGS. 4, 5 and 6, is typical of structures found in conventional synchronous microprocessors where the timing of READ and WRITE operations is controlled by externally supplied clock signals. In such a system it is fairly easy to store the identity of registers which are still to be written to by instructions in progress. If however a microprocessor is to be designed for asynchronous operation with a micropipeline framework several additional factors must influence the design.

Figure 7:
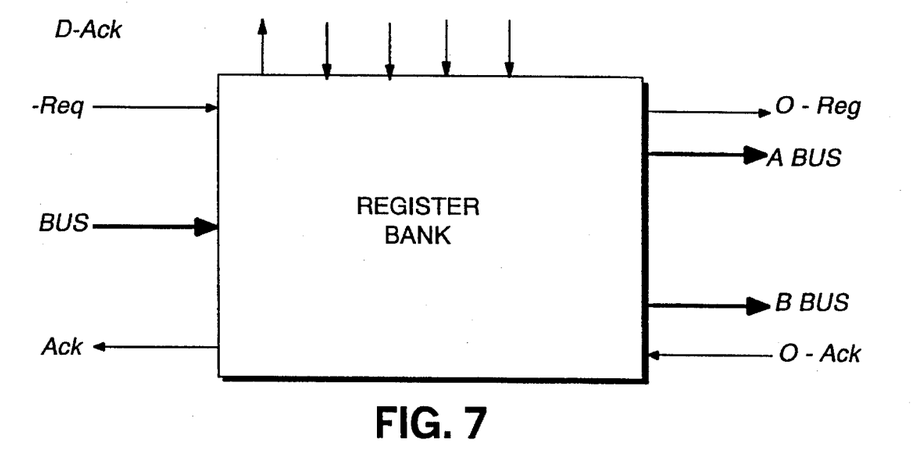
FIG. 7 illustrates an input/output interface of a type which may be used to achieve asynchronous operation of a register bank of the type shown in FIG. 4 with reference to two read and one write bus.

The first factor is that.the input/output must be modified so that it obeys the bundled data convention described in the above-referenced paper by Sutherland. FIG. 7 illustrates how this might be applied in the case of a register bank. In the case of asynchronous machines, the instruction decoder supplies three register addresses (a, b, w) and signals D-Req to indicate that the three register addresses are valid. The register bank decodes these values internally to one out of N representation and then outputs the selected register contents on to the A and B buses. When the data on the output buses is valid, an event is signalled in the form of an output 0-Req on the corresponding request line. The next stage receives the output data and signals an acknowledgement of receipt in the form of signal 0-Ack. The register bank can then acknowledge the instruction decoder by signal D-Ack and the decoder can then begin generating the next instructions.

It is possible that one of the READ operands a,b may be the destination of the result of the previous instruction. In such circumstances the operation must wait until the operation has been written back into the register before that register can be read. When a result is written to the register selected by the w decoder a signal W-Req is received on the W bus. The register bank issues an acknowledgement in the form of signal W-Ack when the WRITE operation has been completed. Within the micropipeline framework this happens completely asynchronously with respect to any read operations. Until the signal W-Ack has been issued, the register to which the result is being written must be locked against reading.

The purpose of register locking is to stall any READS from registers that are to be written to by an instruction which is already in progress until the WRITE operation has been completed. This can be achieved by keeping a list of registers that are to be written to by instructions in progress. Before a register READ operation is initiated, this list must be checked to ensure that the read can indeed proceed. If the check fails, i.e. that register which it is desired to read is identified in the list, then the READ must wait until the register has been written to and the relevant entry removed from the list.

Figure 8:
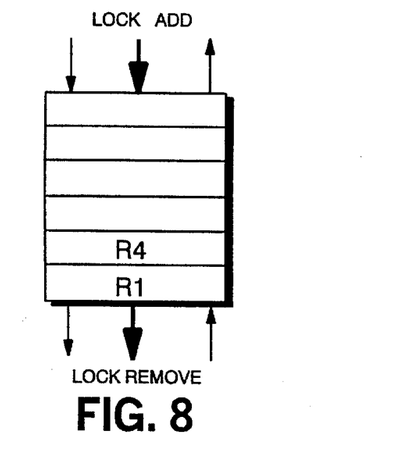
FIG. 8 illustrates a conventional lock circuit for use in a register bank operating a synchronously.

Register locking may be implemented by using a FIFO as shown in FIG. 8. This shows a lock FIFO after two instructions of a series of three instructions have been issued. For example these instructions could be as follows:

Instruction 1—R1:=R2+R3

Instruction 2—R4:=R5−R3

Instruction 3—R7:=R9−R4.

Thus the first instruction reads out the contents of registers R2 and R3 and starts the process to calculate the sum of these two contents which will subsequently be written to R1. As soon as registers R2 and R3 have been read the identity of R1 is entered in the bottom stage of the lock FIFO. The second instruction then reads registers R5 and R6 and the identity of register R4 is entered in the next to the bottom section of the FIFO as it is to register R4 that the results of the second instruction will be written. As soon as the content of register R5 and R6 have been read the third instruction requests a read of registers R9 and R4. As R4 is identified in the lock register the third instruction must be delayed until the second instruction is completed by writing the result of the second instruction into register R4. The problem is thus presented of comparing the addresses of the register to be read in instruction 3 with the content of the lock FIFO. This of course could be achieved by reading out the identity of every register identified in the lock FIFO and comparing that identity with the identities of the registers to be read in accordance with the third instruction. This is difficult to achieve in a simple manner.

Figure 9:
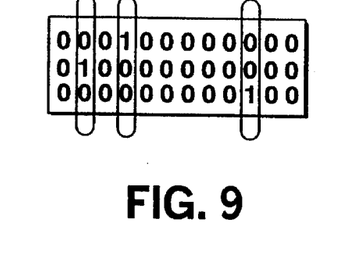
FIG. 9 illustrates bit patterns which are generated in a simplified embodiment of the present invention.

FIG. 9 illustrates the representation of information in a lock register of the type shown in FIG. 8 arranged in accordance with the present invention such that each register identified in the lock register is so identified by the presence of a single bit in one memory element of the lock register. In the case illustrated in FIG. 9, it is assumed that each horizontal row includes a number of elements equal to the number of registers in the register bank. Furthermore, the lock register represented by FIG. 9 is capable of storing at the most three register identities. In the case of FIG. 9, the bottom level of the register stores a logic 1 bit in a column corresponding to register R10. The next to the bottom row stores a logic 1 in the column corresponding to register R2. In the top level of the register a logic 1 is stored in the column corresponding to register R4. Thus the lock register represented by FIG. 9 contains single bit data identifying registers R2, R4 and R10 as being the registers to which results will be written upon completion of three instructions that are in progress. A further instruction which then appears can only execute if it does not require a read from register R2, R4 or R10.

As will be appreciated from FIG. 9 the condition to be detected is whether or not any bit is set (logic "1") at any point in the column corresponding to the register to be read. Each column of bits is combined by an appropriate cascade of gates as illustrated in FIG. 2 such that if any memory element in any one column has been set to logic level 1 then a condition set output is generated for that column giving a direct indication that the register associated with that column is to be written to by an instruction which has not yet been fully executed.

In addition to providing information related to which registers should be locked pending completion of related instructions, the FIFO can be used to supply the decoded register address of the next to be executed write operation. Thus as illustrated in FIG. 9, the next WRITE operation must be related to the writing of data to register R10. When a write request occurs the write operation then uses the address of register R10 simply by reading that register identity from the lock FIFO. When writing to register R10 is completed, an Ack signal is issued to the lock FIFO to flush the bottom entry. Flushing this entry also clears the condition set in the detector allowing any stalled READ operation of R10 to proceed. Once the bottom entry has been flushed the contents of the lock register moves down one such that the bottom entry identifies register R2 as locked and the next to the bottom entry identifies register R4 as locked.

Thus, the lock FIFO provides two functions. Firstly it indicates whether or not a register is locked, and secondly it identifies the address for the next write operation.

Figure 10:
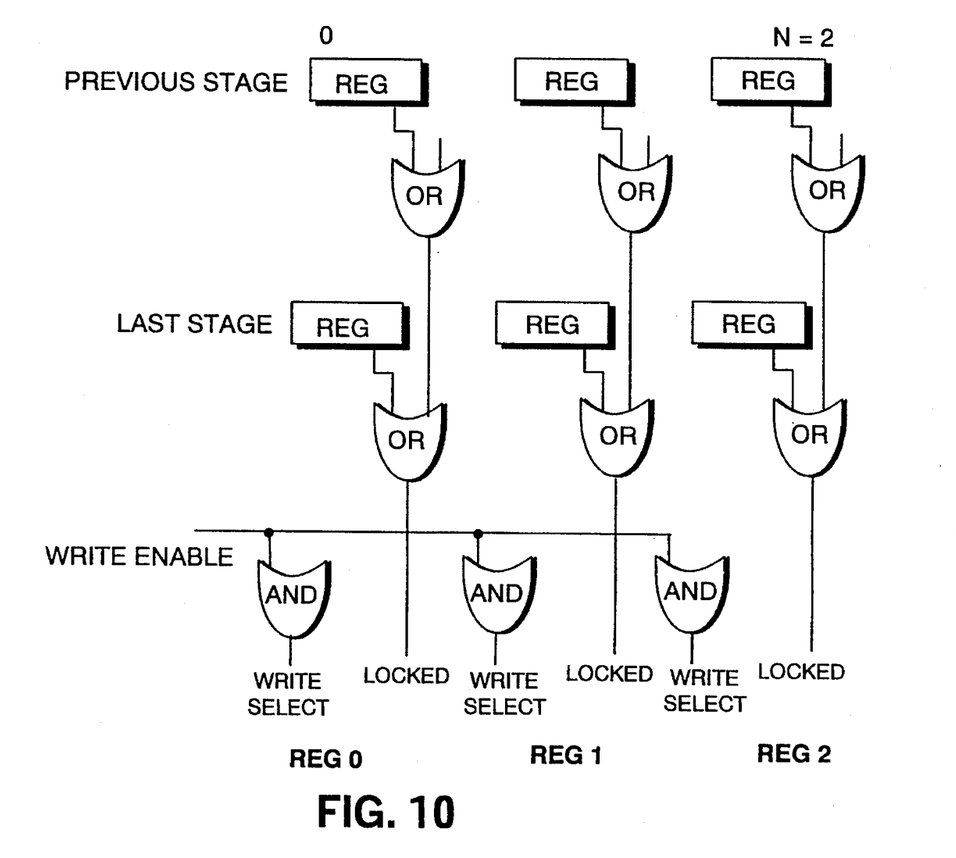
FIG. 10 illustrates schematically an implementation of the present invention in a lock FIFO.

Referring to FIG. 10, this illustrates a lock FIFO of the general type described with reference to FIG. 9 but showing too the circuits provided for indicating a lock condition for at most three registers and for storing the identify of only two locked registers at any one time. The three registers are indicated as Reg. 0, Reg. 1 and Reg. 2. In respect of each register, two outputs are provided, that is condition "locked" and "write select". If an instruction is received which requires writing to Reg. 0, followed by an instruction requiring writing to Reg. 2, then the bottom left register stores logic 1, the top right register stores logic 1 and the other four registers store logic 0. The locked outputs of Reg. 0 and Reg. 2 are then at logic 1 and the write select output of Reg. 0 shows logic 1.

Figure 11:
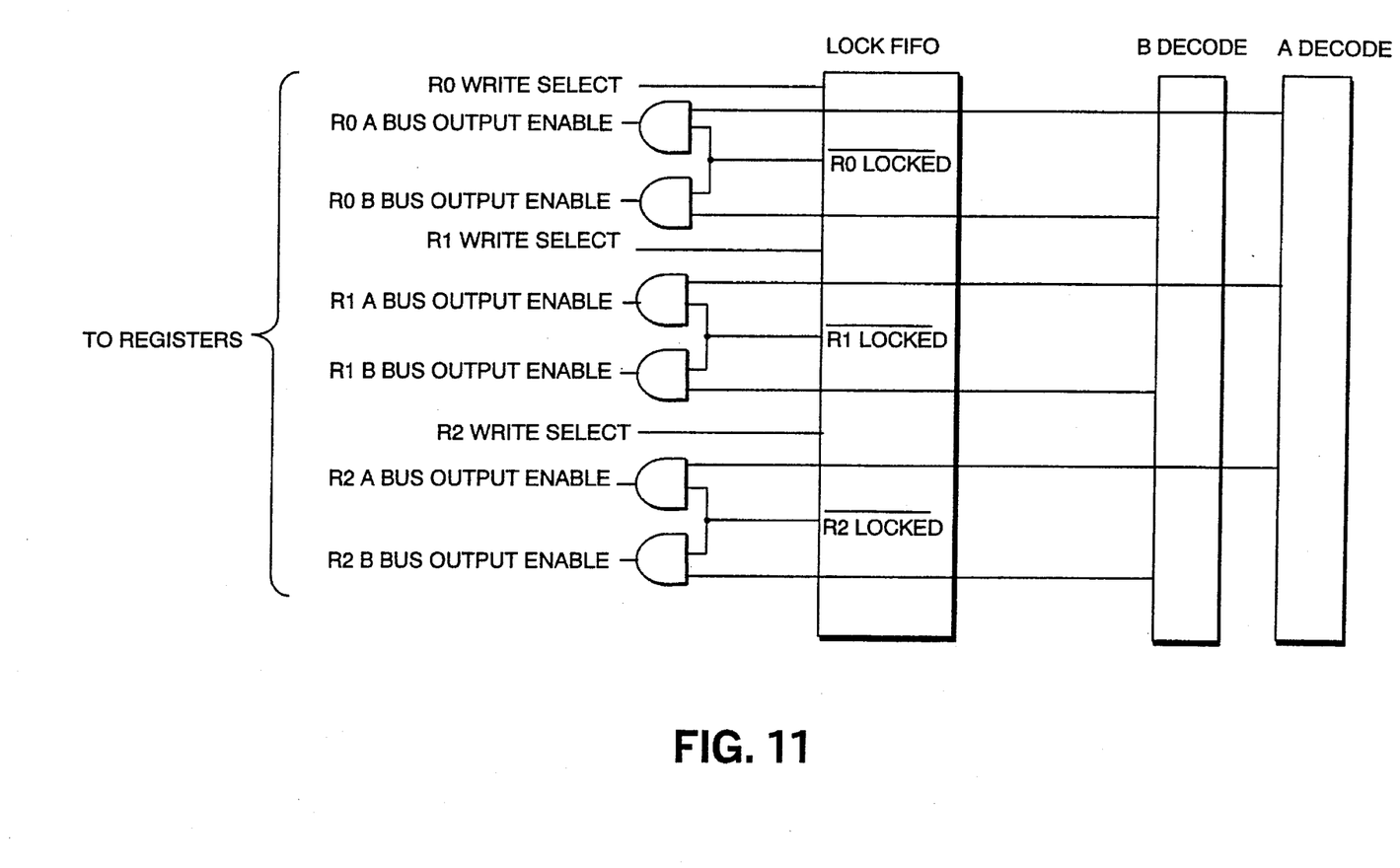
FIG. 11 illustrates the way in which READ operations are delayed using the lock FIFO of FIG. 10.

FIG. 11 illustrates the relevant circuits at a higher level which are used to prevent reading of locked registers. Read selects from the A and B bus decoders are prevented from reaching the register bank until the relevant registers have been unlocked.

The operation of the circuit of FIG. 11 assumes that the three requirements mentioned above are met, that is that the condition bit must be copied from one stage to another such that the condition bit is always present in at least one of the adjacent stages, any empty stage must present an un-set condition, and nothing must enter the FIFO while a decision is being made about the state of the conditions inside the FIFO.

Figure 12:
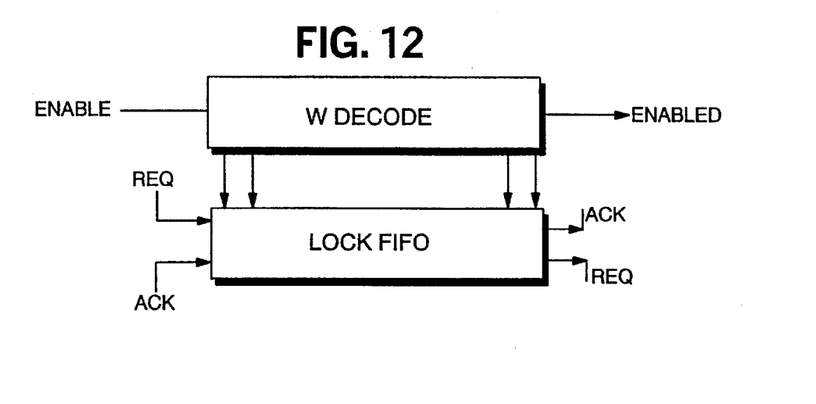
FIG. 12 illustrates schematically arrangements made to ensure zero inputs to the lock FIFO of FIG. 10.

The standard micropipeline has the properties required to meet the first condition. The micropipeline FIFO also has the feature that empty stages are "transparent", so the second condition may be met by holding the input to the FIFO at zero when data is not being inserted into it. The third condition may be satisfied by constraining the register bank design at a higher level as described with reference to FIG. 12. With reference to FIG. 12, the lock FIFO is in effect the output of the W decoder, that is the decoder which identifies registers to which results are to be written. An output enable on the W decoder can be designed so that when there is not a valid write address the output is disabled and presents zero on all bits. This can be fed directly in to the lock FIFO.

Data can be prevented from entering the FIFO at inconvenient times if correct control sequences are used. For example, it can be arranged that operands required by an instruction must be read before the destination register of the result of the that instruction is locked. This is to ensure that an instruction that READS and WRITES the same register does not stall on a lock created by its self. A consequence of this is that register identities cannot be added to the lock FIFO while a READ is in progress. Register identities may be flushed from the bottom of the lock FIFO by write operations which happen asynchronously to read operations.

Dynamic logic may be used in the register bank to reduce the size of the register cells. Dynamic logic requires two phases of execution that is a pre-charge to some known state, followed by enabling of the logic for result evaluation.

Reading from and writing to the register bank can be considered to be separate asynchronous operations. Accordingly they will be described separately below.

With regard to reading from the register bank, the sequence of operations in a dynamic register bank is as follows:

1. Pre-charge the A and B buses.
2. Receive a request (D-Req).
3. Enable the outputs of the A and B decoders.
4. Latch the output values when they are valid and issue D-Ack to the instruction decoder.
5. Disable the A and B decoders and begin pre-charge whilst locking the register to which the instruction is to write.
6. Wait for locking the pre-charging to complete when locking is complete, issue D-Ack to the instruction decoder.
7. Return to step 2 above.

There can be an arbitrary delay between steps 2 and 3 because the registers could be locked whilst waiting to be written to. To prevent the pre-charge state from decaying, charge retaining structures are used on the buses. These can easily be overdriven by the register cells.

In order to decide whether or not data on the output is valid, an extra bit is added to each register so that each register is 33 bits wide in a 32 bit processor. The extra bit is tied low inside each cell and the bus is pre-charged high.

When the register outputs are enabled, bit number 33 will therefore make a transition from level 1 to level 0. This transition can be detected and used as a completion signal to indicate when the data is valid, i.e. the register cells have driven the bus. Similarly, during pre-charge bit number 33 of the bus will go from level 0 back to level 1 and this transition can be used to indicate that pre-charging is complete.

It should be noted that in step 5 above the register locking operation is performed concurrently with the register bank pre-charge, so that it is not necessary to add to the minimum register read cycle time provided that locking is no slower than the pre-charge time.

Figure 13:
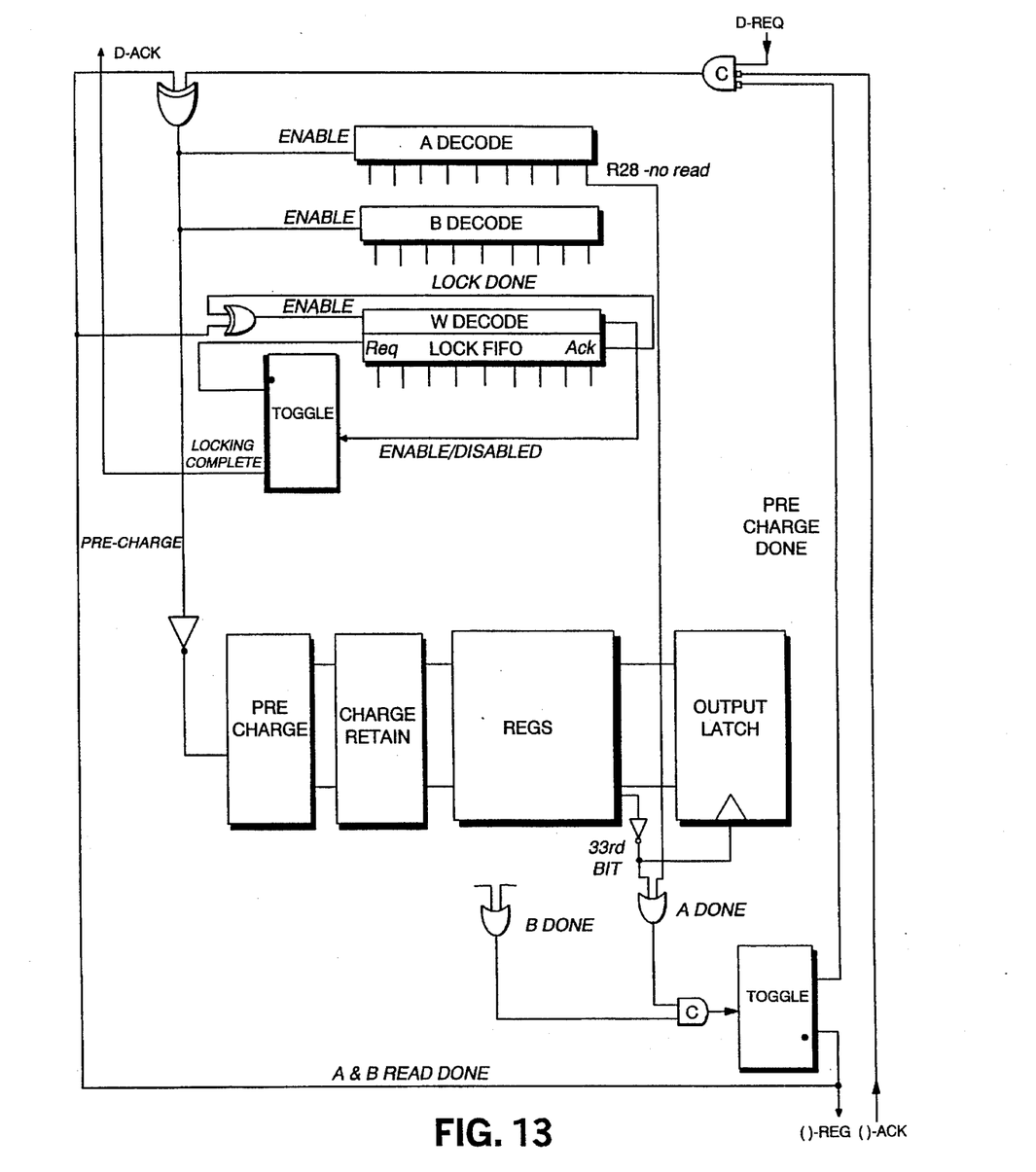
FIG. 13 illustrates register reading in a register bank incorporating a lock FIFO of the type illustrated in FIG. 10.

FIG. 13 brings together all the elements referred to above. FIG. 13 also outlines three features not previously mentioned. These are:

(1) Not all instructions use two operands. When fewer than two operands are required, the instruction completion signals are derived from the decode select of a non-existent register. In the case illustrated in FIG. 13, a microprocessor is being considered which includes 27 registers. A virtual 28th register (R28) is provided to generate the required completion signal.

(2) A toggle is provided in the "Enabled" output of the W decoder". A delay is provided on the input to the request on the lock FIFO. This is required given the interaction between the right decoder and the lock FIFO. For example, if an event arrives at the exclusive-OR gate which causes an enable signal to go logic high to turn on the outputs of the W decoder, these values must settle before they are strobed into the lock FIFO by the signal Re, which is caused by the "Enabled" signal switching the toggle element. When the FIFO has latched to the write address an Ack signal is generated. This is fed back to the exclusive OR gate and cancels the enable, causing the outputs of the W decode to return to logic 0 which then cancels the "Enabled" signal and generates the "locking complete" event. The only interaction between the write operation and a read operation is the removal of a lock that allows a stalled read to proceed. Here the write operation strobes the output Ack of the lock FIFO, and the read is allowed to proceed correctly without further interaction.

(3) Completion of read operations generates signals B Done and A Done. These signals are combined by an AND gate and trigger to toggle (flip flop) which generates the signal that is interpreted as signal Ack and Req.

Figure 14:
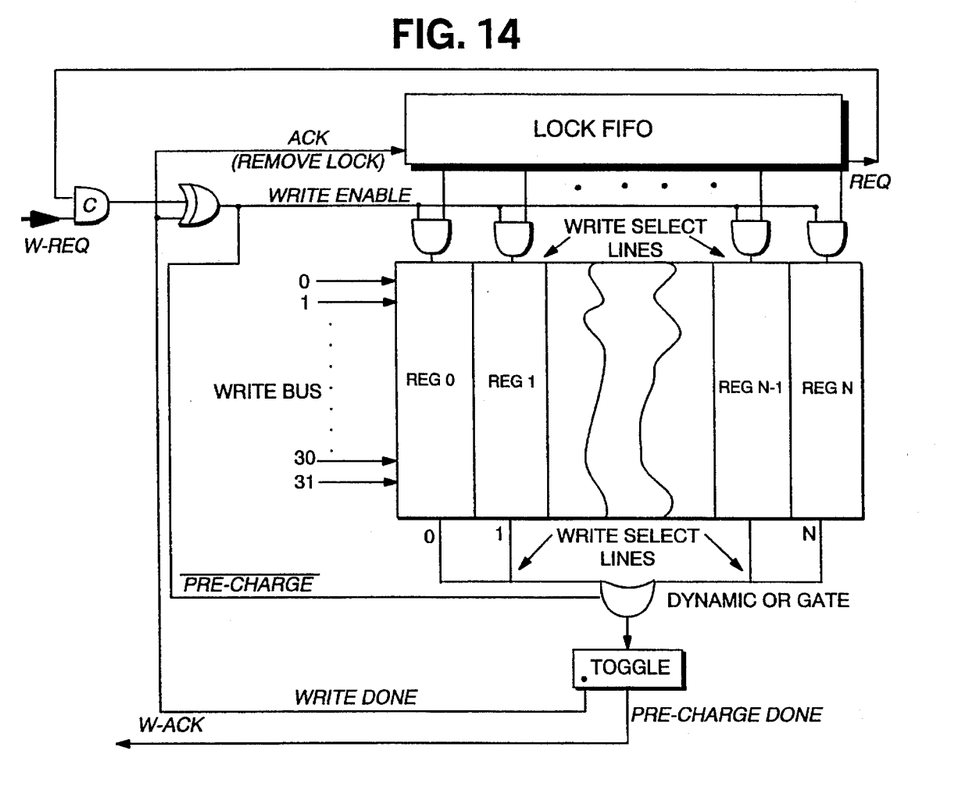
FIG. 14 illustrates writing operations into a register bank incorporating a lock FIFO of the type illustrated in FIG. 10.

The address of the register to be written is in the last stage of the lock FIFO when the write Req is received. To complete the write operation it must be enabled on the write enable of the appropriate register. FIG. 14 is a schematic illustration for the register bank write logic. With respect of FIG. 14, the sequence of operations is as follows:

(1) The signal W-Req arrives, causing the write enable bus to go high, thus forcing the outputs of the lock FIFO to be asserted on the register bank write enable lines.

(2) The write begins when the register cells have their input enabled. The select line goes vertically through the register bank and out of the bottom to an OR gate. This gate detects a transition from logic 0 to logic 1 on a single one of the register select and causes the "write done" signal to be generated.

(3) The "write done" signal is fed back to the exclusive-OR which cancels the write enable and allows the large dynamic OR gate to be pre-charged, making the output change from logic 1 to logic 0. This transition is used as a "pre-charge done" signal. The "write done" signal is also fed to the lock FIFO to remove the last write address.

(4) The signal Req from the FIFO (lock removed) is combined with the signal W-Req to ensure there is a valid write address before the next write commences. The "pre-charging done" signal forms the signal W-Ack out to the write bus.

I claim:

1. A condition detector for an asynchronous pipeline, wherein each stage in the pipeline comprises condition storing means for storing a single bit of data indicating whether or not the condition to be detected is set in that stage, said single bit in the condition storing means of one stage being transferred to the condition storing means of a succeeding stage in the pipeline when data stored in said one stage is transferred to said succeeding stage during operation of the pipeline, means are provided for detecting whether or not any one of the condition storing means of the pipeline stages indicates that the condition is set, and means are provided for generating a condition set output if any one of the condition storing means of the pipeline stages indicates that the condition is set.

2. A condition detector according to claim 1, wherein the detecting means is an array of gates, one in respect of each stage, with each gate having a first input connected to the conditions storing means of a respective stage, a second input connected to an output of the gate of a preceding stage, and an output connected to the second input of the gate of the succeeding stage.

3. A condition detector according to claim 2, comprising a further gate at each stage arranged to combine the condition bit with a stage occupied bit.

4. A condition detector for an asynchronous pipeline comprised of a plurality of sequential pipeline stages in which a condition to be detected can be set, wherein each stage in the pipeline comprises:

condition storing means, for storing a single bit of data indicating whether the condition to be detected is set in said each stage, said single bit in the condition storing means of said each stage being transferred to the condition storing means of a succeeding stage in the pipeline when data stored in said each stage is transferred to said succeeding stage during operation of the pipeline; and said condition detector includes:

means for detecting whether the condition storing means of the pipeline stages indicates that the condition is set in said each stage; and means for generating a condition set output if any one of the condition storing means of the pipeline stages indicates that the condition is set.

5. A condition detector according to claim 4, wherein the detecting means comprises:

an array of gates, one associated with each stage, with each gate having a first input connected to the condition storing means of an associated stage, a second input connected to an output of the gate of a preceding stage, and an output connected to the second input of the gate of a succeeding stage.

6. A condition detector according to claim 5, comprising a further gate at each stage arranged to combine the condition bit with a stage occupied bit.

7. An asynchronous pipeline system provided with a lock circuit to prevent a register being read if that register is to be written to by a preceding instruction, comprising a plurality of registers, each register having contents, means for generating a series of instructions to be executed by the system, means for reading the contents of one or more registers identified by an instruction, means for performing an operation identified by the instruction on the read out contents to produce a result, means for writing the result to a register identified by the instruction, a first in first out lock circuit for storing the identity of registers to be written to by instructions which are in progress, and means for delaying reading of the contents of any register identified by an instruction if that register is identified in the lock circuit, wherein the first in first out lock circuit comprises a two dimensional array of memory elements with each element being located at a respective intersection of columns and rows of the array, the number of columns of the array is equal to the number of registers and data related to each register is stored in a respective column, the number of rows in the array is equal to the maximum number of register identities that can be stored in the lock circuit, means are provided to identify each register to be written to by an instruction which is in progress by storing a single bit of data in the memory element of a respective row at the intersection of that row and the respective column of that register, and means are provided for determining whether a register will be written to by checking whether or not a said single bit of data has been stored in the respective column of that register.

8. An asynchronous pipeline apparatus comprising:
   (i) a plurality of pipeline stages, each pipeline stage storing pipeline data;
   (ii) a plurality of condition storing means, each condition storing means associated with a respective pipeline stage, each condition storing means for storing condition data indicative of whether a processing condition is set for that pipeline stage; and
   (iii) detector means, coupled to said condition storing means for each pipeline stage, for generating a condition set output in response to any one of said condition storing means storing condition data indicative of said condition being set;
   wherein said pipeline data and said condition data of each pipeline stage are transferred together between successive pipeline stages and respective associated condition storing means along said asynchronous pipeline.

9. An asynchronous pipeline apparatus comprising:
   (i) a plurality of pipeline stages, each of said pipeline stages storing an instruction to be processed by said asynchronous pipeline;
   (ii) a plurality of registers for storing data, said registers being read from and written to in response to instructions being processed by said asynchronous pipeline;
   (iii) a first in first out lock circuit means for storing lock data identifying registers to be written to by instructions being processed by said asynchronous pipeline, said lock circuit means comprising an array of columns and rows of memory elements, each row of aid array including a memory element for each of said plurality of registers with lock data being passed between said rows as said instructions pass between said pipeline stages; and
   (iv) means for delaying reading data from one register in response to said first in first out lock circuit storing lock data identifying said one register as being written to by a preceding instruction within said asynchronous pipeline.

10. An asynchronous pipeline system provided with a lock circuit to prevent a register being read if that register is to be written to by a preceding instruction, comprising:
    a plurality of registers, each register having contents;
    means for generating a series of instructions to be executed by the system;
    means for reading the contents of one or more registers identified by an instruction;
    means for performing an operation identified by the instruction on the read out contents to produce a result;
    means for writing the result to a register identified by the instruction;
    a first in first out lock circuit for storing the identity of registers to be written to by instructions which are in progress; and
    means for delaying reading of the contents of any register identified by an instruction if that register is identified in the lock circuit, wherein the first in first out lock circuit comprises:
    a two dimensional array of memory elements with each element being located at a respective intersection of columns and rows of the array, the number of columns of the array is equal to the number of said plurality of registers and data related to each register is stored in a respective column, the number of rows in the array is equal to the maximum number of register identities that can be stored in the lock circuit,
    means for identifying each register to be written to by an instruction which is in progress by storing a single bit of data in the memory element of a respective row at the intersection of that row and the respective column of that register, and
    means for determining whether a register will be written to by checking whether or not a said single bit of data has been stored in the respective column of that register.

* * * * *